(12) United States Patent
Jung et al.

(10) Patent No.: US 9,689,275 B2
(45) Date of Patent: Jun. 27, 2017

(54) VARIABLE GEOMETRY TURBO SYSTEM

(71) Applicants: Hyundai Motor Company, Seoul (KR); Hyundai Wia Corporation, Changwon-si (KR)

(72) Inventors: Kyung-Jae Jung, Suwon-si (KR); Seung Yeon Lee, Seoul (KR); Kwang Hwan Kim, Suwon-si (KR); Gil-Beom Lee, Seoul (KR); Jun Gwan Park, Suwon-si (KR); Sung-Jin Yang, Suwon-si (KR); Ui Yeon Park, Pyeongtaek-si (KR); Kyung-Wook Jin, Incheon (KR)

(73) Assignees: Hyundai Motor Company, Seoul (KR); Hyundai Wia Corporation, Changwon-si (KR)

( * ) Notice: Subject to any disclaimer, the term of this patent is extended or adjusted under 35 U.S.C. 154(b) by 398 days.

(21) Appl. No.: 14/310,910

(22) Filed: Jun. 20, 2014

(65) Prior Publication Data

US 2015/0118030 A1    Apr. 30, 2015

(30) Foreign Application Priority Data

Oct. 30, 2013   (KR) .................. 10-2013-0129965

(51) Int. Cl.
| | |
|---|---|
| *F01D 17/16* | (2006.01) |
| *F01D 5/14* | (2006.01) |
| *F02B 37/24* | (2006.01) |

(52) U.S. Cl.
CPC ............ *F01D 17/165* (2013.01); *F01D 5/146* (2013.01); *F02B 37/24* (2013.01);
(Continued)

(58) Field of Classification Search
CPC ......... F01D 17/165; F01D 5/146; F01D 5/148
(Continued)

(56) References Cited

U.S. PATENT DOCUMENTS

| | | | | |
|---|---|---|---|---|
| 4,880,351 | A | * | 11/1989 | Inoue .................... F01D 17/165 415/159 |
| 4,927,325 | A | | 5/1990 | Yano |

(Continued)

FOREIGN PATENT DOCUMENTS

| | | |
|---|---|---|
| DE | 39 12 348 A1 | 10/1989 |
| EP | 0 247 905 A2 | 12/1987 |

(Continued)

*Primary Examiner* — Dwayne J White
*Assistant Examiner* — Topaz L Elliott
(74) *Attorney, Agent, or Firm* — Morgan Lewis & Bockius LLP (57) ABSTRACT

A variable geometry turbo system that controls a flow of exhaust gas introduced into a turbine of a turbo charger may include a vane base ring in which the turbine may be positioned at a center thereof, a fixed vane which may be fixed onto a first surface of the vane base ring to guide the exhaust gas introduced into the turbine, a variable vane which may be pivotally positioned on the first surface of the vane base ring and adjacent to the fixed vane so as to vary a flow path of the exhaust gas introduced into the turbine, a vane cover ring fixed to the vane base ring with the fixed vane and the variable vane interposed therebetween, and an actuating module coupled to the variable vane and selectively actuating the variable vane.

8 Claims, 8 Drawing Sheets

(52) U.S. Cl.
CPC ...... *F05D 2220/40* (2013.01); *F05D 2230/53* (2013.01); *F05D 2250/713* (2013.01); *Y02T 10/144* (2013.01)

(58) Field of Classification Search
USPC .................................................. 415/163, 164
See application file for complete search history.

(56) References Cited

U.S. PATENT DOCUMENTS

| | | | |
|---|---|---|---|
| 5,165,849 A * | 11/1992 | Nakagawa | F04D 29/462 415/148 |
| 6,453,556 B1 * | 9/2002 | Watanabe | B21K 3/04 29/557 |
| 8,104,280 B2 * | 1/2012 | Akita | B21C 23/001 29/889.7 |
| 8,226,356 B2 * | 7/2012 | Kay | F01D 5/147 415/119 |
| 8,814,529 B2 * | 8/2014 | Fiala | F01D 5/145 416/223 A |
| 2012/0251302 A1 | 10/2012 | Ramb | |
| 2015/0071777 A1 * | 3/2015 | Willer | F01D 9/041 415/208.2 |
| 2015/0104296 A1 * | 4/2015 | Yokoyama | F02B 37/24 415/146 |

FOREIGN PATENT DOCUMENTS

| | | |
|---|---|---|
| EP | 0 248 624 A2 | 12/1987 |
| EP | 0 276 023 A2 | 7/1988 |
| EP | 1 201 881 B1 | 5/2002 |
| JP | 62-282127 A | 12/1987 |
| JP | 4433892 B2 | 1/2010 |
| KR | 10-2008-0014724 A | 2/2008 |
| WO | WO 2013/064875 A1 | 5/2013 |

* cited by examiner

VARIABLE GEOMETRY TURBO SYSTEM

CROSS-REFERENCE TO RELATED APPLICATION

The present application claims the benefit of priority to Korean Patent Application No. 10-2013-0129965 filed on Oct. 30, 2013, the entire contents of which is incorporated herein by this reference for all purposes.

BACKGROUND OF THE INVENTION

Field of Invention

The present invention relates to a variable geometry turbo system in which a turbine is rotated by exhaust gas, and a compressor rotated by the turbine compresses intake air to increase an output of an engine and improve the quality of exhaust gas.

Description of Related Art

Turbo chargers are widely used in internal combustion engines and in the past were particularly applied to large-sized trucks or ship engines. In recent years, turbo chargers have been used in passenger vehicles in order to produce high output in smaller engines. Turbo chargers more fully combust fuel to improve the quality of exhaust gas. Various functions and designs of turbo chargers are disclosed in prior art.

In addition, a turbo charger generally includes a turbine rotated by the exhaust gas and a compressor rotated by the turbine to compress intake air, and has a structure in which a shaft connects the turbine and the compressor.

Existing variable geometry turbo chargers include a vane base ring and a vane cover ring with a variable vane interposed therebetween and a stud or a sleeve is adopted in order to keep a predetermined interval between the vane base ring and the vane cover ring.

Other prior art variable geometry turbo chargers experience the problem that the stud or the sleeve that keeps the predetermined interval between the vane base ring and the vane cover ring is one of the factors that increase exhaust resistance thereby decreasing efficiency. The stud or sleeve also increases the number of parts and a weight of the system thereby further decreasing engine efficiency.

Therefore, what is needed is a variable geometry turbo charger with reduced weight which can still effectively reduce resistance due to the exhaust gas flowing through the variable vanes.

The information disclosed in this Background of the Invention section is only for enhancement of understanding of the general background of the invention and should not be taken as an acknowledgement or any form of suggestion that this information fully describes the prior art that known to a person skilled in the art.

BRIEF SUMMARY

Various aspects of the present invention are directed to providing a variable geometry turbo system with a decreased number of parts and a decreased weight by keeping an interval between a vane base ring and a vane cover ring and controlling the flow of exhaust gas.

In an aspect of the present invention, a variable geometry turbo system that controls a flow of exhaust gas introduced into a turbine of a turbo charger, may include a vane base ring in which the turbine is positioned at a center thereof, a fixed vane which is fixed onto a first surface of the vane base ring to guide the exhaust gas introduced into the turbine, a variable vane which is pivotally positioned on the first surface of the vane base ring and adjacent to the fixed vane so as to vary a flow path of the exhaust gas introduced into the turbine, a vane cover ring fixed to the vane base ring with the fixed vane and the variable vane interposed therebetween, and an actuating module coupled to the variable vane and selectively actuating the variable vane.

The variable vane is positioned at an inside of the vane base ring so as to be placed close to the turbine and the fixed vane is positioned at an outside of the variable vane, and an inner end of the fixed vane and an outer end of the variable vane are slidably engaged with each other.

A variable pin is formed at a portion where the variable vane and the fixed vane are engaged with each other, a convex curved surface is formed on the outer end of the variable vane to correspond to an outer circumference of the variable pin, and a concave curved surface is formed on the inner end of the fixed vane to correspond to the convex curved surface.

A part of the concave curved surface coincides with a part of an inner circumference of the insertion hole in a center-axis direction of the insertion hole.

An insertion hole is formed in the vane base ring, near the base of the fixed vane, a variable pin inserted into and engaged to the insertion hole is integrally formed in the variable vane, and the variable vane rotates around the variable pin to vary the flow path of the exhaust gas.

The actuating module may include an internal lever of which a first end is fixed to the variable pin that protrudes on a second surface of the fixed vane ring, a control ring engaged with a second end of the internal lever, and an actuator coupled to the control ring through a link and selectively actuates the control ring through the link.

In order to smoothly induce the flow of the exhaust gas according to a rotational position of the variable vane, the fixed vane may have a streamlined portion formed in a streamlined shape from the outer end to an inner end thereof, and the streamlined portion may have a structure in which a thickness decreases from the outer end to the inner end thereof and thereafter, a thickness of a portion engaged with the variable vane increases again.

A protruded portion that protrudes on an outer circumference of the vane base ring with a predetermined distance is formed on the outer end of the fixed vane on the vane base ring.

In other aspects of the present invention, variable geometry turbo system may include a fixed vane which may be formed in a vane base ring, and the fixed vane can keep an interval from a vane cover ring and guide the flow of exhaust gas. Moreover, a variable vane may be installed adjacent to the fixed vane to variably control the flow of the exhaust gas according to an operation state.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
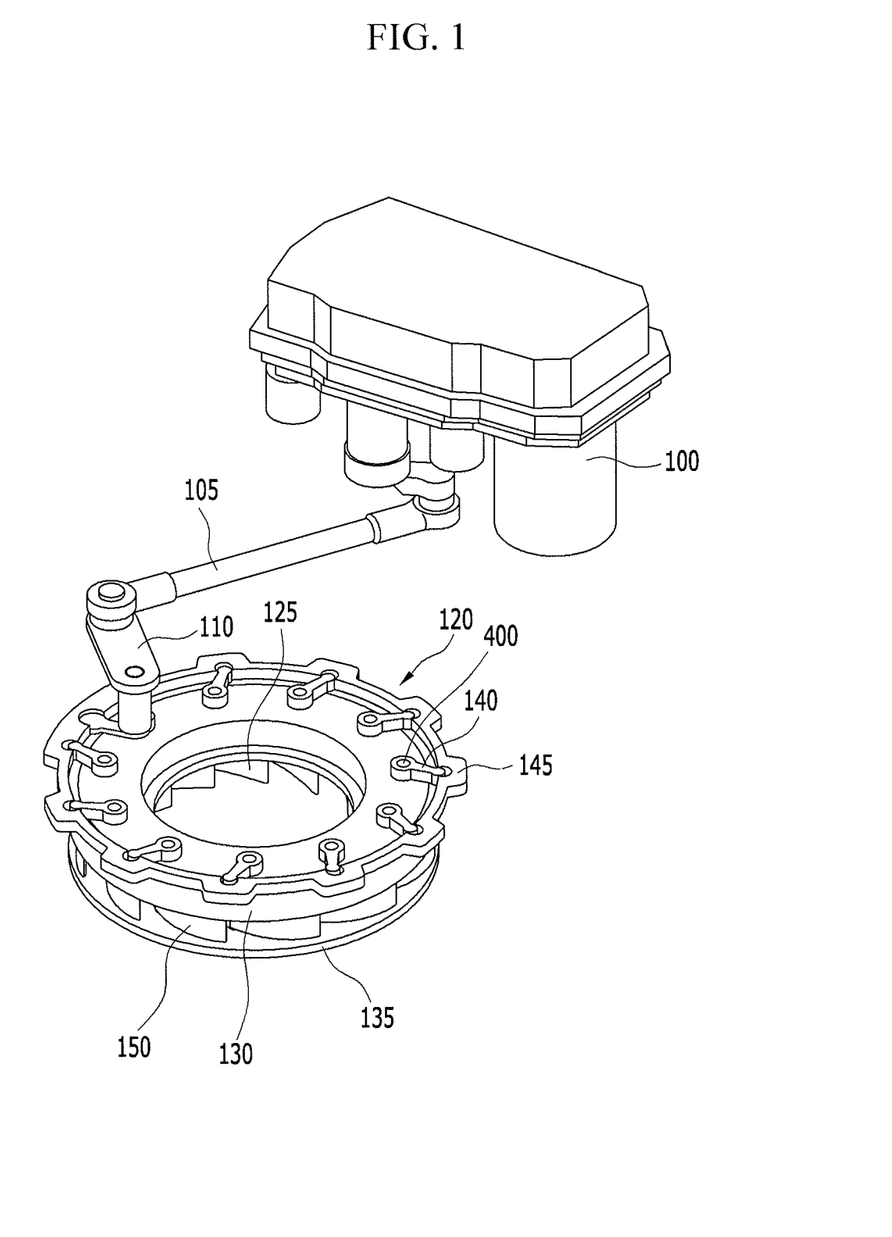
FIG. 1 is a schematic perspective view of a variable geometry turbo system according to an exemplary embodiment of the present invention.

FIG. 1 is a schematic perspective view of a variable geometry turbo system according to an exemplary embodiment of the present invention.

Referring to FIG. 1, the variable geometry turbo system includes an actuator 100, a steering rod 105, a lever 110, and a variable geometry cartridge 120, and the variable geometry cartridge 120 includes a control ring 145, an internal lever 140, a variable pin 400, a fixed vane 150, a variable vane 125, a vane base ring 130, and a vane cover ring 135.

Moreover, in the exemplary embodiment of the present invention, a turbine of a compressor is positioned at the center of the vane base ring 130.

The vane base ring 130 and the vane cover ring 135 are positioned with a predetermined interval, and exhaust gas flows between the vane base ring 130 and the vane cover ring 135 to rotate the turbine.

The fixed vane 150 and the variable vane 125 that control the flow of the exhaust gas are positioned between the vane base ring 130 and the vane cover ring 135. The exhaust gas flows from the outer portion of the vane base ring to the turbine at the center of the ring, thus the fixed vane is leading and the variable vane is trailing, relative to the direction of exhaust gas flow.

The fixed vane 150 is integrally formed in the vane base ring 130 and constantly guides the flow of the exhaust gas in a fixed state and the variable vane 125 varies the flow of the exhaust gas while rotating around the variable pin 400 in the vane base ring 130.

The actuator 100 pulls or pushes the steering rod 105 to rotate the control ring 145 and when the control ring 145 rotates the variable pin 400 through the internal lever 140, the variable vane 125 is rotated.

Figure 2:
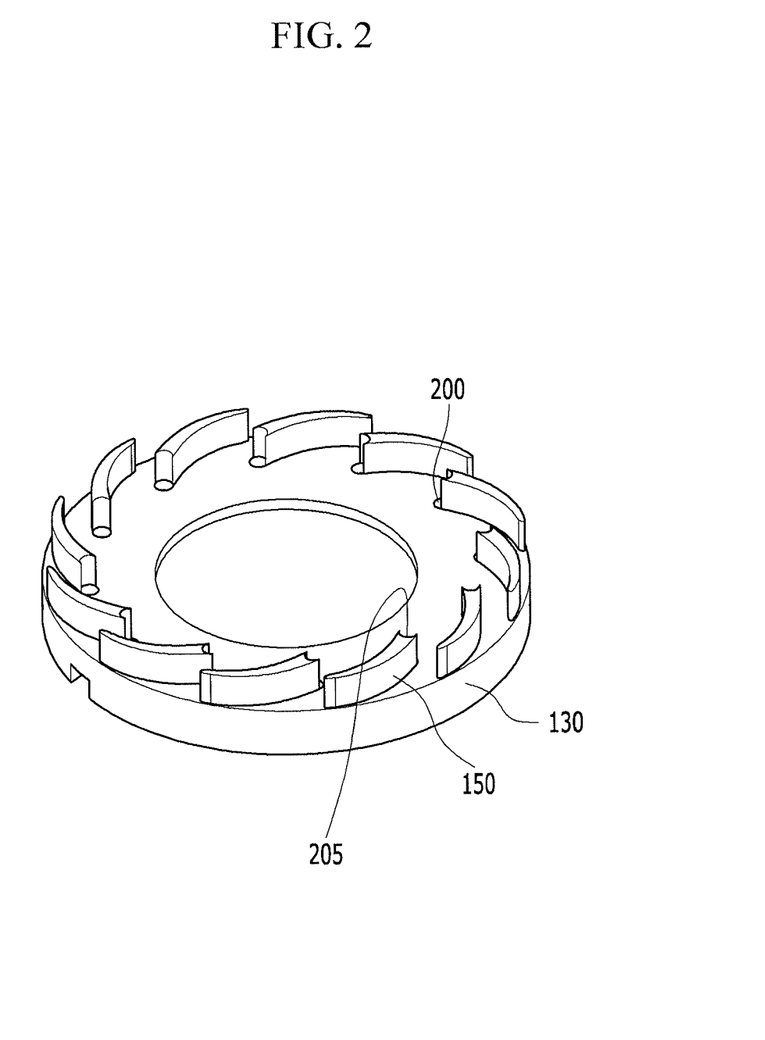
FIG. 2 is a perspective view of a vane base ring provided in the variable geometry turbo system according to an exemplary embodiment of the present invention.

FIG. 2 is a perspective view of a vane base ring provided in the variable geometry turbo system according to the exemplary embodiment of the present invention.

Referring to FIG. 2, the fixed vane 150 is integrally formed on one surface of the vane base ring 130, a concave curved surface 205 is formed at an inner end of the fixed vane 150, and an insertion hole 200 is formed to correspond to the concave curved surface 205.

Figure 3:
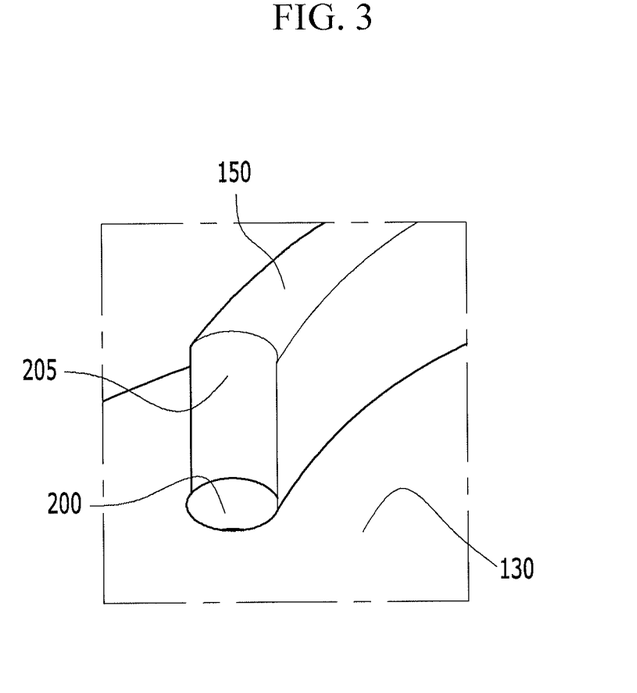
FIG. 3 is a partial detailed perspective view of the vane base ring according to an exemplary embodiment of the present invention.

FIG. 3 is a partial detailed perspective view of the vane base ring according to the exemplary embodiment of the present invention.

Referring to FIG. 3, the fixed vane 150 integrally protrudes on one surface of the vane base ring 130, the concave curved surface 205 is formed on the inner end of the fixed vane 150, and the insertion hole 200 is formed in the vane base ring to correspond to the concave curved surface 205.

Moreover, the concave curved surface 205 may have the same shape as an inner circumference of the insertion hole 200 and the concave curved surface 205 may have the same shape in the longitudinal direction of the insertion hole 200.

Figure 4:
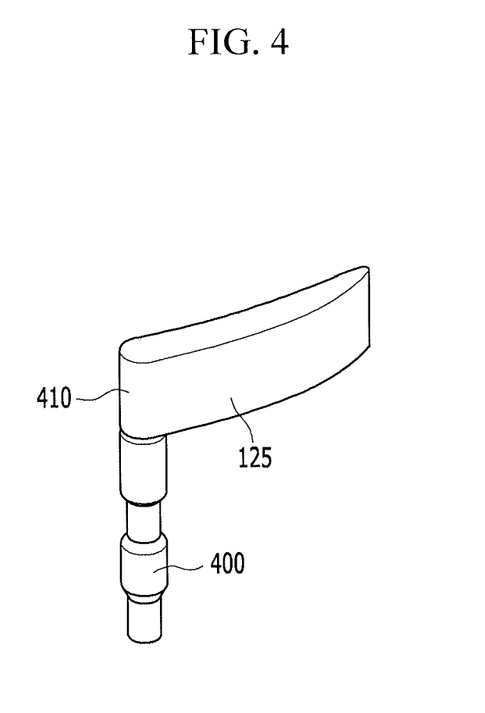
FIG. 4 is a perspective view of a variable vane provided in the variable geometry turbo system according to an exemplary embodiment of the present invention.

FIG. 4 is a perspective view of a variable vane provided in the variable geometry turbo system according to the exemplary embodiment of the present invention.

Referring to FIG. 4, a convex curved surface 410 is formed on one end of the variable vane 125 and the variable pin 400 is integrally formed to correspond to the convex curved surface 410.

The variable pin 400 is inserted into the insertion hole 200 formed in the vane base ring 130 and the convex curved surface 410 is slidably engaged with the concave curved surface 205.

Figure 5:
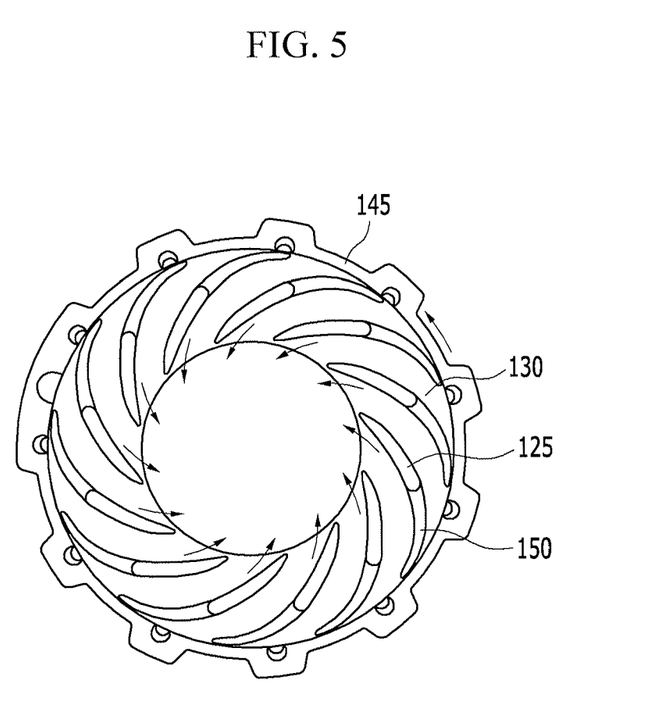
FIGS. 5 and 6 are side views illustrating an operation state of the variable geometry turbo system according to the exemplary embodiment of the present invention.
Figure 6:
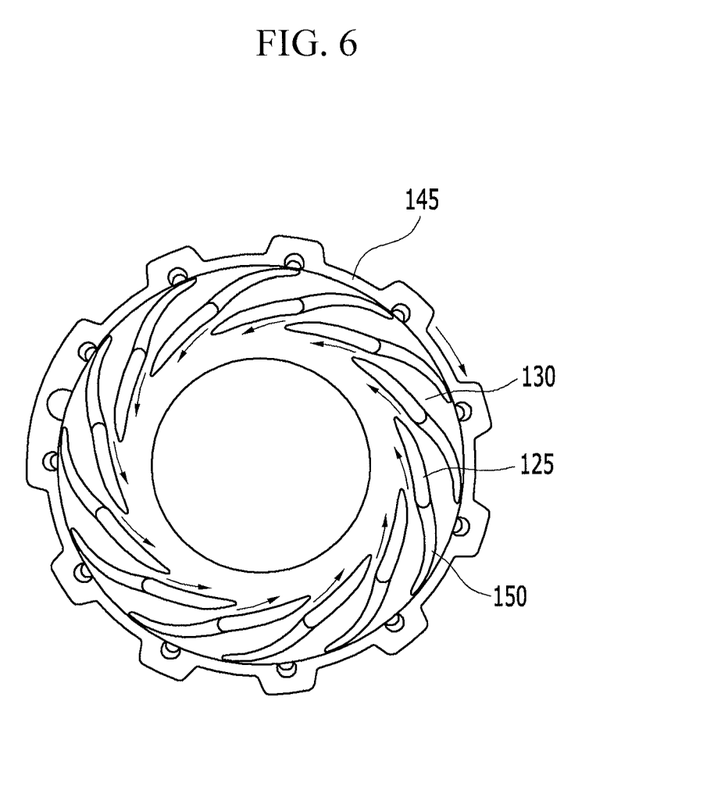

FIGS. 5 and 6 are side views illustrating an operation state of the variable geometry turbo system according to the exemplary embodiment of the present invention.

Referring to FIG. 5, when the control ring 145 rotates counterclockwise, the variable vane 125 rotates counterclockwise around the variable pin 400 and the other end of the variable pin 400 gets closer to the turbine.

Referring to FIG. 6, when the control ring 145 rotates clockwise, the variable vane 125 rotates clockwise around the variable pin 400 and the other end of the variable pin 400 grows apart from the turbine.

Accordingly, a flow characteristic of the exhaust gas supplied from the outside to the center is varied according to a rotational position of the variable vane 125 to actively control the rotation of the turbine of the turbo charger.

Figure 7:
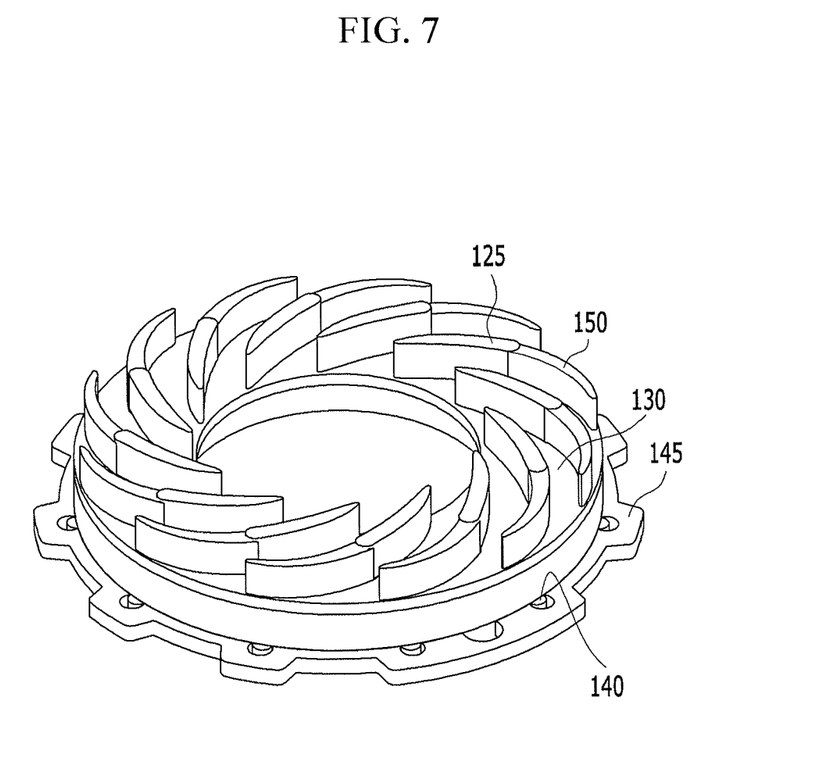
FIG. 7 is a side view of a variable geometry turbo system according to another exemplary embodiment of the present invention.
Figure 8:
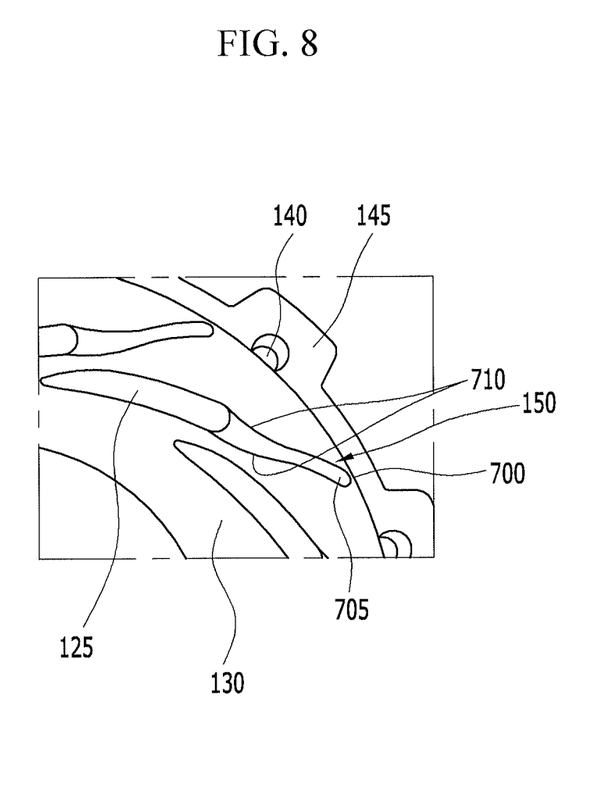
FIG. 8 is a partial detailed side view of a variable geometry turbo system shown in FIG. 7.

FIG. 7 is a side view of a variable geometry turbo system according to another exemplary embodiment of the present invention and FIG. 8 is a partial detailed side view of a variable geometry turbo system shown in FIG. 7.

Referring to FIG. 8, the variable geometry cartridge includes the vane base ring 130, the fixed vane 150, the variable vane 125, the internal lever 140, and the control ring 145.

In FIG. 8, a characteristic difference from FIGS. 1 to 5 is described and similar parts are not described.

Referring to FIG. 8, a protruded portion 705 is formed on one end of the fixed vane 150 and the protruded portion 705 protrudes on an outer circumference 700 of the vane base ring 130 with a predetermined distance to more effectively control the flow of the exhaust gas.

Moreover, the fixed vane 150 has a streamlined portion 710 having a structure in which a thickness decreases from one end to the other end and thereafter, increases again, and a portion engaged with the variable vane 125 is thicker than a middle portion.

Accordingly, even though the variable vane 125 rotates within a predetermined angle range, the flow of the exhaust gas may be smoothly and stably controlled.

In the exemplary embodiment of the present invention, a fixed vane is formed in a vane base ring, and the fixed vane can keep an interval from a vane cover ring and guide the flow of exhaust gas. Moreover, a variable vane is installed adjacent to the fixed vane to variably control the flow of the exhaust gas according to an operation state.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. It is intended that the scope of the invention be defined by the Claims appended hereto and their equivalents.

What is claimed is:

1. A variable geometry turbo system that controls a flow of exhaust gas introduced into a turbine of a turbo charger, the system comprising:
    a vane base ring in which the turbine is positioned at a center thereof;
    a fixed vane which is fixed onto a first surface of the vane base ring to guide the exhaust gas introduced into the turbine;
    a variable vane which is pivotally positioned on the first surface of the vane base ring and adjacent to the fixed vane so as to vary a flow path of the exhaust gas introduced into the turbine;
    a vane cover ring fixed to the vane base ring with the fixed vane and the variable vane interposed therebetween;
    and an actuating module coupled to the variable vane and selectively actuating the variable vane,
    wherein a variable pin is formed at a portion where the variable vane and the fixed vane are engaged with each other and the variable pin is disposed in a middle of the vane base ring in a radial direction of the vane base ring,
    wherein a convex curved surface is formed on an outer end of the variable vane to correspond to an outer circumference of the variable pin, and
    wherein a concave curved surface is formed on an inner end of the fixed vane to correspond to the convex curved surface, and
    wherein the fixed vane is formed to be concavely curved toward the turbine,
    wherein the fixed vane and the variable vane are configured to be linearly aligned at the variable pin when the variable vane is rotated toward the turbine, and the fixed vane and the variable vane are configured to form a bent angle with respect to each other at the variable pin when the variable vane is fully rotated distally from the turbine,
    wherein the fixed vane is leading and the variable vane is trailing relative to the direction of the exhaust gas flow.

2. The system of claim 1,
    wherein the variable vane is positioned at an inside of the vane base ring so as to be placed close to the turbine and the fixed vane is positioned at an outside of the variable vane, and
    wherein the inner end of the fixed vane and the outer end of the variable vane are slidably engaged with each other.

3. The system of claim 1, wherein a part of a concave curved surface coincides with a part of an inner circumference of an insertion hole in a center-axis direction of the insertion hole.

4. The system of claim 2,
    wherein an insertion hole is formed in the vane base ring, near a base of the fixed vane;
    wherein the variable pin inserted into and engaged to the insertion hole is integrally formed in the variable vane; and
    wherein the variable vane rotates around the variable pin to vary the flow path of the exhaust gas.

5. The system of claim 4, wherein a part of the concave curved surface coincides with a part of an inner circumference of the insertion hole in a center-axis direction of the insertion hole.

6. The system of claim 4, wherein the actuating module includes:
    an internal lever of which a first end is fixed to the variable pin that protrudes on a second surface of the fixed vane ring;
    a control ring engaged with a second end of the internal lever; and
    an actuator coupled to the control ring through a link and selectively actuates the control ring through the link.

7. The system of claim 6, wherein, in order to smoothly induce the flow of the exhaust gas according to a rotational position of the variable vane,
    the fixed vane has a streamlined portion formed in a streamlined shape from an outer end to the inner end thereof, and
    the streamlined portion has a structure in which a thickness decreases from the outer end to the inner end thereof.

8. The system of claim 7, wherein a protruded portion that protrudes on an outer circumference of the vane base ring with a predetermined distance is formed on the outer end of the fixed vane on the vane base ring.

* * * * *